United States Patent Office 2,934,566
Patented Apr. 26, 1960

2,934,566

PREPARATION OF TRIALKYLS OF BORON

Jawad H. Murib, St. Bernard, and Edward A. Grannen, Jr., Cincinnati, Ohio, assignors, by mesne assignments, to AFN, Inc., a corporation of Delaware No Drawing. Application April 7, 1958
Serial No. 726,605

7 Claims. (Cl. 260—606.5)

The present invention relates to a novel method for preparation of trialkylboron compounds and, more particularly, to the production of trialkylboron compounds by a process in which an oxide of boron is utilized as a reactant.

It is known that organoboron compounds may be prepared by reaction of an organoaluminum compound with a boron halide such as boron trifluoride and boron trichloride. However, and as far as we are aware, boron oxides have been considered to be inert to reaction with organoaluminum compounds under reaction conditions similar to those utilized for reaction of the organoaluminum compounds with boron halides to form organoboron compounds. Accordingly, development of a method utilizing an oxide of boron (such as the naturally-occurring boron oxides), whereby the costly, time-consuming requirements for conversion of the oxides to halides is eliminated, is a marked advance in the art. Such a method is provided by the novel process of the present invention as is more fully described hereinafter.

In accordance with this invention, trialkylboron compounds are prepared by reacting an alkylaluminum compound with an oxide of boron in the presence of aluminum and hydrogen. For use in such a reaction, a trialkylaluminum is preferred, such as for example trialkylaluminum compounds in which the alkyl groups contain from 1 to 8 carbon atoms. Specific examples of such trialkylaluminum compounds include trimethylaluminum, triethylaluminum, dimethylethylaluminum, diethylmethylaluminum, tri-isopropylaluminum, triisobutylaluminum, tri-n-butylaluminum, trihexylaluminum, and the like. Alkylaluminum halides or sesquihalides, such as dimethylaluminum chlorides, methylaluminum dichlorides, ethylaluminum dichlorides, diethylaluminum chloride, and the like, may also be used but generally use of such reactants results in lower yields of desired end products contaminated with organoboron halides. The alkylaluminum compound may be used in an amount in excess over the stoichiometric quantity for reaction with the boron-containing reactant to produce the trialkylboron but usually the alkylaluminum compound is employed in an amount less than or substantially equal to the stoichiometric amount for such reaction with the boron compound.

With reference to the boron-containing reactant, the normal oxide $B_2O_3$ or the normal salt $Na_2B_4O_7$ represent the preferred embodiments for practice of this invention. However, other oxides of boron or salts containing oxygen may be used as, for example, boron sub-oxide $B_2O_2$, sodium sub-borate $Na_4B_2O_4$, sodium metaborate $NaBO_2$, and the like. The boron-containing reactant is preferably used in an amount in excess of the stoichiometric amount for reaction with the alkylaluminum compound to produce the trialkyls of boron. However, the invention may suitably be carried out with use of the boron-containing reactant in a substantial stoichiometric equivalent amount.

As aforesaid, the reaction is carried out in the presence of aluminum metal, preferably in finely divided form, although the process is operable with aluminum in the form of foil, wire, etc. Though aluminum represents the preferred embodiment, other metals such as gallium, indium or thallium may be used and, with respect to such metals, as well as aluminum, they should be present in the reaction mixture in an amount at least equivalent to the alkylaluminum compound. However, an excess of the metal may be used if desired as use of an excess does not appear to detrimentally affect the reaction.

To affect the reaction with production of the trialkylboron compounds, it is carried out in presence of hydrogen. Although the reaction can suitably be carried out under a hydrogen pressure of 100 to 3000 p.s.i., a pressure in the range of about 1000 to 1500 p.s.i. is preferred. The reaction proceeds at room temperature and, if desired, can be so carried out but the resulting reaction proceeds slowly under such conditions. Accordingly, use of an elevated temperature such as in the range of 100 to 200° C. is preferred to considerably increase the rate of reaction. In general, a reaction period of from about one to about twenty hours is required for substantial completion of the reaction and, as will be apparent to those skilled in the art, the required time for substantial completion of the invention may be varied depending on particular selection of reaction variables such as the type and rate of mixing of the reaction mixture, the form of the free metal (e.g., aluminum), the hydrogen pressure, and temperature.

In order to further describe the invention, the following embodiments are set forth for purposes of illustration and not limitation. Unless otherwise set forth, when reference is made to use of the reactant in parts, it pertains to parts by weight.

*Example 1*

A mixture of 13.85 parts of powdered aluminum, 17.63 parts of boron oxide and 18 parts of trimethylaluminum were mixed in an autoclave under an argon atmosphere. The argon atmosphere was exchanged for hydrogen and the reactants heated under 1,000 p.s.i.g. at 100° C. for 7½ hours. At the end of this time, the autoclave was cooled to room temperature and the hydrogen and products vented through traps contained in a −196° C. bath. The major product, which was obtained by fractional condensation at −140° C. was identified as trimethylboron, the vapor tensions of which were 86.0 and 32.0 mm. at −63.5 and −78° C. respectively, as compared to the literature values of 86.1 and 32.0 mm. for trimethylboron.

The reactants remaining in the autoclave were heated for an additional four hours under hydrogen pressure at 192° C. and an additional amount of trimethylboron was obtained.

*Example 2*

A mixture of aluminum powder and boron oxide in the ratio of 3.3/1 was ground under an argon atmosphere. 29.35 parts of the resulting fine powder was mixed in an autoclave with 45 parts of triethylaluminum under argon. The autoclave was pressured to 1,000 pounds with hydrogen and heated at 150° C. for one hour. The major product obtained by fractional condensation at −80° C. was identified as triethylboron, the vapor tension of which at 0° C. was 12 mm. as compared to pure triethylboron which has a vapor tension of 12.5 mm. at 0° C.

What is claimed is:
1. A process for preparation of a trialkylboron which comprises reacting an alkylaluminum compound from the group consisting of trialkylaluminum and lower alkylaluminum halides with an oxide of boron in the presence of hydrogen and a metal from the group consisting of aluminum, indium, thallium and gallium.
2. A process, as defined in claim 1, wherein the alkylaluminum compound is a trialkylaluminum in which the alkyl groups contain from one to eight carbon atoms and the metal is aluminum.

3. A process, as defined in claim 1, wherein the boron oxide is used in at least a substantially stoichiometric amount for reaction with the alkylaluminum compound to produce the trialkylboron and the metal is used in an amount at least substantially equivalent to the alkylaluminum compound.

4. A process, as defined in claim 1, wherein the reaction is carried out at a hydrogen pressure of about 100 to about 3000 p.s.i.

5. A process, as defined in claim 1, wherein the reaction is carried out at a temperature of about 100 to about 200° C.

6. A process for preparation of a trialkylboron which comprises reacting, at 100 to 200° C, and a hydrogen pressure of 100 to 3000 p.s.i., a triethylaluminum compound in which the alkyl groups contain one to eight carbon atoms with an oxide of boron in presence of aluminum.

7. A process, as defined in claim 6, wherein the aluminum is finely divided, the boron oxide is used in at least a substantially stoichiometric amount for reaction with the trialkylaluminum to produce the trialkylboron, and the aluminum is used in an amount at least substantially equivalent to the trialkylaluminum.

References Cited in the file of this patent

UNITED STATES PATENTS 2,853,527    Perrine --------------- Sept. 23, 1958